United States Patent
Wang et al.

(10) Patent No.: US 10,134,320 B2
(45) Date of Patent: Nov. 20, 2018

(54) COLOR FILTER AND MANUFACTURING METHOD THEREOF, DISPLAY PANEL, DISPLAY DEVICE AND DRIVING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Huan Wang, Beijing (CN); Mookeun Shin, Beijing (CN); Zhizhong Tu, Beijing (CN); Yong Jun Yoon, Beijing (CN)

(73) Assignees: BOE TECHNOLOGY GROUP XO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/787,121

(22) PCT Filed: Jan. 12, 2015

(86) PCT No.: PCT/CN2015/070532
§ 371 (c)(1),
(2) Date: Oct. 26, 2015

(87) PCT Pub. No.: WO2016/045257
PCT Pub. Date: Mar. 31, 2016

(65) Prior Publication Data
US 2016/0260371 A1    Sep. 8, 2016

(30) Foreign Application Priority Data
Sep. 28, 2014    (CN) .......................... 2014 1 0509950

(51) Int. Cl.
*G02B 27/22*    (2018.01)
*G09G 3/20*    (2006.01)
(Continued)

(52) U.S. Cl.
CPC ........... *G09G 3/2003* (2013.01); *G02B 5/201* (2013.01); *G02B 5/23* (2013.01); *G02B 27/2214* (2013.01);
(Continued)

(58) Field of Classification Search
CPC ......... G02F 1/333; G02F 1/335; G02B 27/22; G06T 15/00; G09G 5/00; G09G 5/10
See application file for complete search history.

(56) References Cited

U.S. PATENT DOCUMENTS 5,822,117 A * 10/1998 Kleinberger ....... G02B 27/2207
348/57
6,392,690 B1    5/2002 Fujii et al.
(Continued)

FOREIGN PATENT DOCUMENTS

CN    1466011 A    1/2004
CN    102636895 A    8/2012
(Continued)

OTHER PUBLICATIONS

First Chinese Office Action dated Feb. 6, 2016; Appln. No. 201410509950.7.
(Continued)

*Primary Examiner* — Chanh Nguyen
*Assistant Examiner* — Nguyen H Truong
(74) *Attorney, Agent, or Firm* — Ladas & Parry LLP; Loren K. Thompson

(57) ABSTRACT

A color filter and a manufacturing method, a display panel, and a display device and a driving method are provided. The color filter includes a plurality of color resists which include
(Continued)

red resists (R), green resists (G) and blue resists (B); and the color filter includes a plurality of pixel regions arranged in a matrix, each pixel region comprises a red sub-pixel region comprising an even number of red sub-sub-pixel regions, a green sub-pixel region including an even number of green sub-sub-pixel regions, a blue sub-pixel region including an even number of blue sub-sub-pixel regions, each red sub-sub-pixel region is provided with a red resist, each green sub-sub-pixel region is provided with a green resist, and each blue sub-sub-pixel region is provided with a blue resist. The manufacturing precision and alignment accuracy of a mask for this color filter is lower than a current technology and reduce the manufacturing difficulty.

3 Claims, 4 Drawing Sheets

(51) Int. Cl.
| | | |
|---|---|---|
| *H04N 13/31* | (2018.01) | |
| *H04N 13/324* | (2018.01) | |
| *G02B 5/23* | (2006.01) | |
| *G02B 5/20* | (2006.01) | |
| *G09G 5/14* | (2006.01) | |
| *G09G 3/00* | (2006.01) | |

(52) U.S. Cl.
CPC ............... *G09G 3/003* (2013.01); *G09G 5/14* (2013.01); *H04N 13/31* (2018.05); *H04N 13/324* (2018.05); *G09G 2300/0443* (2013.01); *G09G 2300/0452* (2013.01)

(56) References Cited

U.S. PATENT DOCUMENTS

| | | | | |
|---|---|---|---|---|
| 2006/0050385 | A1* | 3/2006 | Uehara | G02B 27/2214 359/465 |
| 2007/0086090 | A1 | 4/2007 | Wang et al. | |
| 2007/0153160 | A1* | 7/2007 | Lee | G02F 1/133512 349/95 |
| 2008/0266471 | A1 | 10/2008 | Hisatake | |
| 2010/0085517 | A1 | 4/2010 | Hong | |
| 2012/0154722 | A1 | 6/2012 | Kang et al. | |
| 2013/0155034 | A1* | 6/2013 | Nakayama | G09F 9/35 345/204 |
| 2013/0155127 | A1* | 6/2013 | An | H04N 13/0029 345/691 |
| 2013/0241964 | A1* | 9/2013 | Ohyama | G09G 3/003 345/690 |
| 2013/0321911 | A1* | 12/2013 | Yamayoshi | G02B 27/2214 359/462 |
| 2015/0124200 | A1 | 5/2015 | Jiang et al. | |
| 2016/0240117 | A1* | 8/2016 | Xu | G09G 3/003 |

FOREIGN PATENT DOCUMENTS

| | | |
|---|---|---|
| CN | 103149730 A | 6/2013 |
| CN | 103163683 A | 6/2013 |
| CN | 103261946 A | 8/2013 |
| CN | 103376592 A | 10/2013 |
| CN | 103838035 A | 6/2014 |
| JP | 2008-076955 A | 4/2008 |
| JP | 2012-133319 A | 7/2012 |

OTHER PUBLICATIONS

International Search Report & Written Opinion Appln. No. PCT/CN2015/070532; dated Jul. 22, 2015.
Second Chinese Office Action dated Aug. 1, 2016; Appln. No. 201410509950.7.
Extended European Search Report; dated May 15, 2018; Appln. No. 15778592.4.

* cited by examiner

COLOR FILTER AND MANUFACTURING METHOD THEREOF, DISPLAY PANEL, DISPLAY DEVICE AND DRIVING METHOD THEREOF

TECHNICAL FIELD

At least one embodiment of the present disclosure relates to a color filter and a manufacturing method thereof, a display panel, a display device and a driving method thereof.

BACKGROUND

A grating 3D (namely, three-dimensional) display device mainly comprises: a display screen and a grating superimposed on the front or back of the display screen. The display screen includes a plurality of sub-pixels arranged in a matrix. The grating includes light-blocking strips and light-transmitting strips, which are alternately arranged. Upon 3D display being performed, a left-eye image signal is applied to half of the sub-pixels of the display screen and a right-eye image signal is applied to the other half of the sub-pixels; and the sub-pixels applied with the left-eye image signal and the sub-pixels applied with the right-eye image signal are alternately arranged along a row direction.

When a person views a display image at an appropriate position, because there is a certain distance between a left eye and a right eye, namely the viewing angle of the left eye and the viewing angle of the right eye are different, and the light-blocking strips of the grating have a certain blocking function on the sub-pixels, the left eye can only receive light passing through the sub-pixels applied with the left-eye image signal and the right eye can only receive light passing through the sub-pixels applied with the right-eye image signal, and hence the left-eye image light and the right-eye image light are separated in space. Because a left-eye image and a right-eye image are images captured from different angles, the left-eye image and the right-eye image are superimposed in the brain, and hence the 3D display effect can be produced.

SUMMARY

At least one embodiment of the present disclosure provides a color filter and a manufacturing method thereof, a display panel, and a display device and a driving method thereof, so as to reduce the manufacturing difficulty of the color filter on the premise of not reducing the resolution.

At least one embodiment of the present disclosure provides a color filter, which comprises a black matrix, a plurality of color resists and a plurality of pixel regions arranged in a matrix. The black matrix includes a plurality of first black matrix strips extending along a row direction and a plurality of second black matrix strips extending along a column direction, and the plurality of first black matrix strips and the plurality of second black matrix strips are intersected with each other to form a plurality of mesh regions arranged in a matrix; the plurality of color resists is respectively disposed in the plurality of mesh regions and includes red resists, green resists and blue resists; each pixel region includes a red sub-pixel region, a green sub-pixel region and a blue sub-pixel region; the red sub-pixel region includes an even number of red sub-sub-pixel regions, each red sub-sub-pixel region is provided with one of the red resists therein; the green sub-pixel region includes an even number of green sub-sub-pixel regions, each green sub-sub-pixel region is provided with one of the green resists therein; and the blue sub-pixel region includes an even number of blue sub-sub-pixel regions, and each blue sub-sub-pixel region is provided with one of the blue resists therein.

At least one embodiment of the present disclosure further provides a color filter manufacturing method for manufacturing the foregoing color filter. The manufacturing method comprises: forming a black matrix on a substrate, so that the black matrix includes a plurality of first black matrix strips extending along a row direction and a plurality of second black matrix strips extending along a column direction, and the plurality of first black matrix strips and the plurality of second black matrix strips are intersected with each other to form a plurality of mesh regions arranged in a matrix; and forming a plurality of color resists respectively in the plurality of mesh regions formed by the black matrix, so that the plurality of color resists comprises red resists, green resists and blue resists; the color filter includes a plurality of pixel regions arranged in a matrix; each pixel region includes a red sub-pixel region, a green sub-pixel region and a blue sub-pixel region; the red sub-pixel region includes an even number of red sub-sub-pixel regions, each red sub-sub-pixel region is provided with one of the red resists therein, the green sub-pixel region includes an even number of green sub-sub-pixel regions, each green sub-sub-pixel region is provided with one of the green resists therein, the blue sub-pixel region includes an even number of blue sub-sub-pixel regions, and each blue sub-sub-pixel region is provided with one of the blue resists therein.

At least one embodiment of the present disclosure further provides a display panel, which comprises: the foregoing color filter.

At least one embodiment of the present disclosure further provides a display device, which comprises: the foregoing display panel, and a slit grating superimposed on the display panel.

At least one embodiment of the present disclosure further provides a driving method for the display device. The display panel of the display device includes a plurality of pixels arranged in a matrix; each pixel includes a red sub-pixel, a green sub-pixel and a blue sub-pixel; the red sub-pixel includes an even number of red sub-sub-pixels, the green sub-pixel includes an even number of green sub-sub-pixels, and the blue sub-pixel includes an even number of blue sub-sub-pixels. The driving method comprises: within a time period of one frame, applying a left-eye image signal to half of red sub-sub-pixels of each red sub-pixel, half of green sub-sub-pixels of each green sub-pixel, and half of blue sub-sub-pixels of each blue sub-pixel, and meanwhile applying a right-eye image signal to the other half of red sub-sub-pixels of each red sub-pixel, the other half of green sub-sub-pixels of each green sub-pixel, and the other half of blue sub-sub-pixels of each blue sub-pixel; and meanwhile driving the slit grating to form light-blocking strips and light-transmitting strips, which are alternated, so that upon the display device being viewed at a predetermined viewing position, light passing through the sub-sub-pixels applied with the right-eye image signal is blocked by the light-blocking strips and cannot enter a left eye and light passing through the sub-sub-pixels applied with the left-eye image signal is transmitted from the light-transmitting strips and enters the left eye, the light passing through the sub-sub-pixels applied with the left-eye image signal is blocked by the light-blocking strips and cannot enter a right eye and the light passing through the sub-sub-pixels applied with the right-eye image signal is transmitted from the light-transmitting strips and enters the right eye.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the study, the inventors of the present application noticed that: the color of the sub-pixels of a display screen is generally arranged according to the circulation of the sequence of red (R), green (G) and blue (B); a pixel is formed by one red sub-pixel, one green sub-pixel and one blue sub-pixel; and each sub-pixel includes a color resist disposed on a color filter correspondingly. For the pursuit of high resolution, the size of the sub-pixels is smaller and smaller and the requirements on the manufacturing precision and the alignment accuracy of masks for forming the color resists is higher and higher, and this causes the increase of difficulty in manufacturing the color filter.

Figure 1:
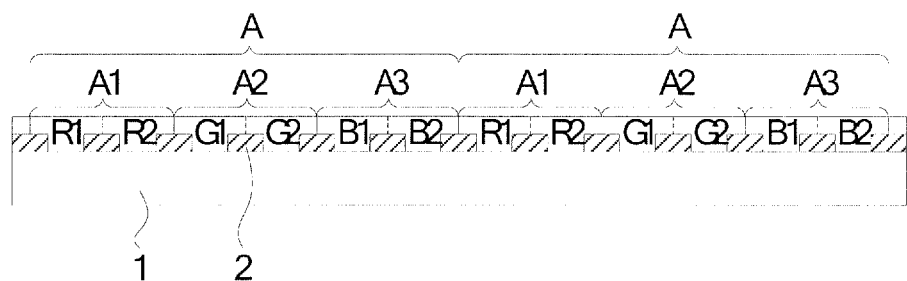
FIG. 1 is a sectional view of a color filter provided by an embodiment of the present disclosure.
Figure 2:
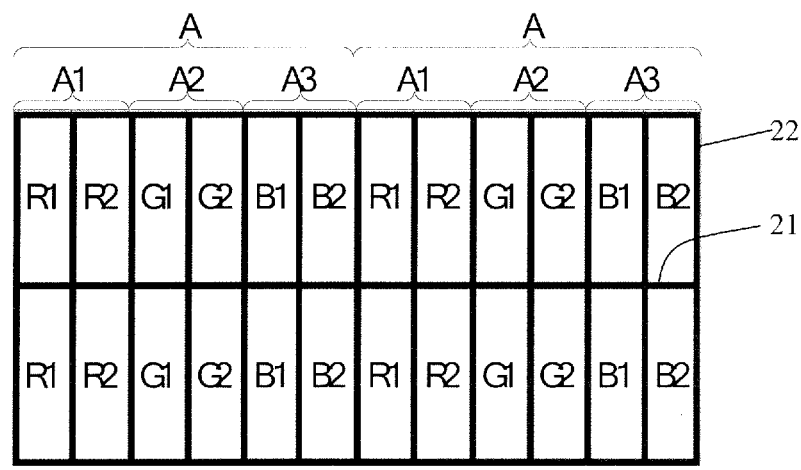
FIG. 2 is a plan view of a color filter provided by an embodiment of the present disclosure.

At least one embodiment of the present disclosure provides a color filter. As illustrated in FIGS. 1 and 2, the color filter comprises a substrate 1, a black matrix 2 disposed on the substrate 1, and a plurality of color resists. The black matrix 2 includes a plurality of first black matrix strips 21 extending along a row direction and a plurality of second black matrix strips 22 extending along a column direction; the plurality of first black matrix strips 21 and the plurality of second black matrix strips 22 are intersected with each other to form a plurality of mesh regions arranged in a matrix; and the plurality of color resists is respectively disposed in the plurality of mesh regions and comprises red (R) resists, green (G) resists and blue (B) resists.

The arrangement of the color resists on the above-mentioned color filter is as follows: a plurality of pixel regions A arranged in a matrix is included; each pixel region A includes an R sub-pixel region A1, a G sub-pixel region A2 and a B sub-pixel region A3; the R sub-pixel region A1 includes an even number of R sub-sub-pixel regions, each R sub-sub-pixel region is provided with an R resist (referring to R1 or R2 in FIGS. 1 and 2); the G sub-pixel region A2 includes an even number of G sub-sub-pixel regions, each G sub-sub-pixel region is provided with a G resist (referring to G1 or G2 in FIGS. 1 and 2); and the B sub-pixel region A3 includes an even number of B sub-sub-pixel regions, and each B sub-sub-pixel region is provided with a B resist (referring to B1 or B2 in FIGS. 1 and 2).

In an embodiment of the present disclosure, the substrate 1, for instance, can be a glass substrate, a quartz substrate, or a plastic substrate, etc. The black matrix 2, for instance, can adopt a black light-blocking resin material. No limitations are imposed in the embodiment of the present disclosure.

Correspondingly, at least one embodiment of the present disclosure provides a method for manufacturing the foregoing color filter. The method comprises the following step S1 and step S2.

Step S1: forming a black matrix 2 on a substrate 1, so that the black matrix 2 includes a plurality of first black matrix strips 21 extending along a row direction and a plurality of second black matrix strips 22 extending along a column direction, and the plurality of first black matrix strips 21 and the plurality of second black matrix strips 22 are intersected with each other to form a plurality of mesh regions arranged in a matrix.

Step S2: forming a plurality of color resists respectively in the plurality of mesh regions formed by the black matrix 2, so that the plurality of color resists comprises red resists, green resists and blue resists. The arrangement of the color resists on this color filter can refer to the above description relating to the arrangement of the color resists on the color filter, and repeated descriptions are omitted thereto.

Correspondingly, at least one embodiment of the present disclosure further provides a display panel, which comprises the foregoing color filter. The display panel can be a liquid crystal display (LCD) panel, or an organic light-emitting diode (OLED) panel, etc. No limitations is imposed in the embodiment of the present disclosure.

Figure 10:
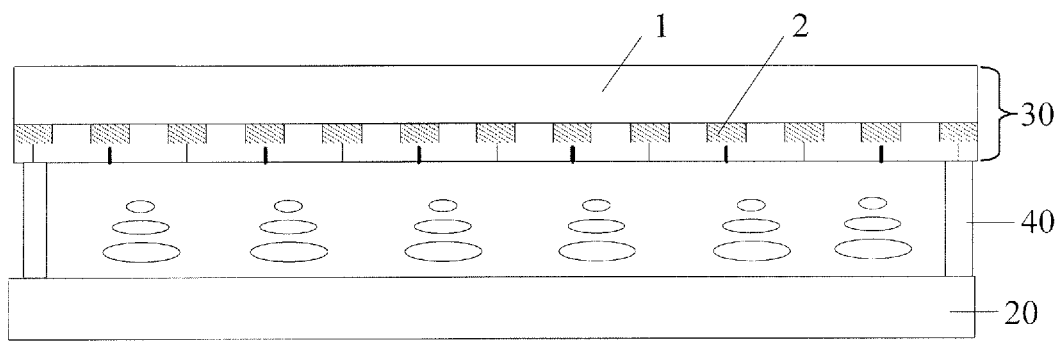
FIG. 10 is a schematic structural sectional view of a display panel provided by an embodiment of the present disclosure.

In at least one embodiment, the display panel can comprise an array substrate 20 and a cell-assembled substrate 30 arranged to be opposite to the array substrate 20, as shown in FIG. 10. For instance, the array substrate 20 and the cell-assembled substrate 30 can be sealed by a frame sealant 40 to form a liquid crystal cell, and a liquid crystal material is filled in the liquid crystal cell.

In at least one embodiment, the color filter can be arranged to be opposite to the array substrate; or the color filter can be disposed in the array substrate. For instance, FIG. 10 is a schematic structural view of a display panel in which a color filter and an array substrate are arranged to be opposite to each other. As illustrated in FIG. 10, the display panel can comprise an array substrate 20 and a cell-assembled substrate 30 arranged to be opposite to each other; the color filter is disposed in the cell-assembled substrate 30, the above-mentioned substrate 1 included by the color filter can be taken as a base substrate of the cell-assembled substrate 30, and the black matrix 2 is disposed on the substrate 1 and faces the array substrate 20. For instance, in a situation in which the color filter is disposed in the array substrate, the cell-assembled substrate, arranged to be opposite to the array substrate, in the display panel can be a transparent substrate. No limitations are imposed in the embodiment of the present disclosure.

Figure 3:
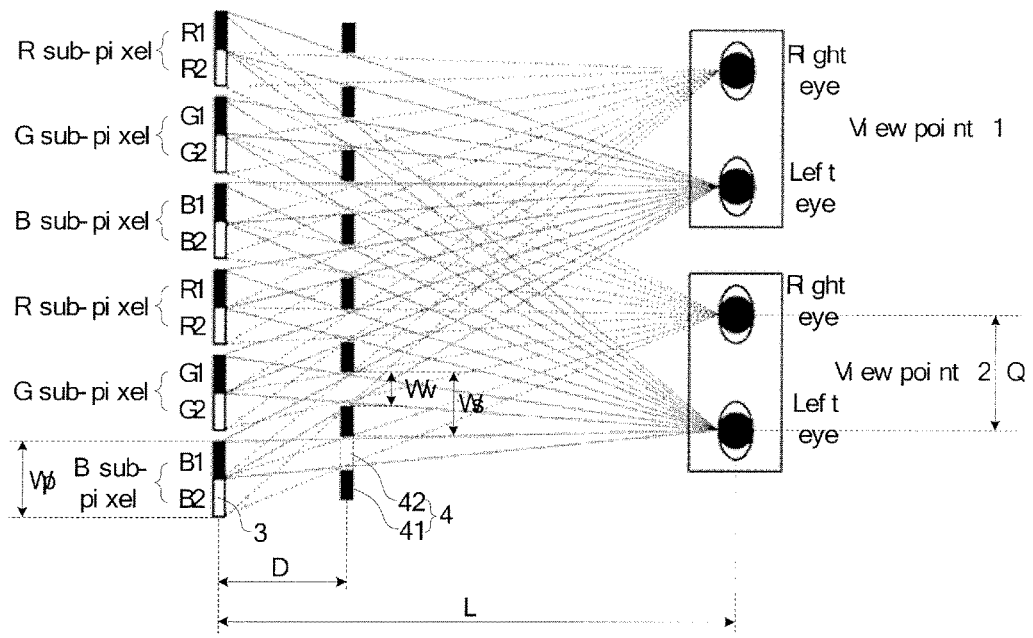
FIG. 3 is a view of a light path in the case of 3D display performed by a display device provided by an embodiment of the present disclosure.

Correspondingly, at least one embodiment of the present disclosure further provides a 3D display device. As illustrated in FIG. 3, the 3D display device comprises the foregoing display panel 3 and a slit grating 4 superimposed on the display panel 3. In the embodiment of the present disclosure, the slit grating 4 is disposed on a light-emitting surface of the display panel 3. The display panel 3 includes a plurality of pixels arranged in a matrix, each pixel includes an R sub-pixel, a G sub-pixel and a B sub-pixel; and the R sub-pixel includes an even number of R sub-sub-pixels, the G sub-pixel includes an even number of G sub-sub-pixels, and the B sub-pixel includes an even number of B sub-sub-pixels.

It should be noted that: in order to highlight the blocking and transmitting function of the slit grating 4 on pixels in the display surface of the display panel 3, the display panel 3 shown in FIG. 3 is simplified as the arrangement of the pixels in the display surface, and there is a certain distance D between the slit grating 4 and the display surface of the display panel 3. Actually, the slit grating 4 and the display panel 3 are attached together, and the distance D between the slit grating 4 and the display surface of the display panel 3 depends on the thickness of a substrate, of the display panel 3, on a side close to the slit grating 4.

Figure 4:
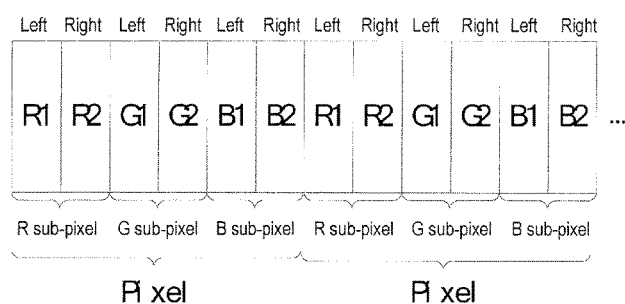
FIG. 4 is a drive schematic view of a display device provided by an embodiment of the present disclosure.

Correspondingly, at least one embodiment of the present disclosure further provides a driving method for the above-mentioned display device. As illustrated in FIGS. 3 and 4, the driving method comprises: within a time period of one frame, applying a left-eye image signal to half of R sub-sub-pixels of each R sub-pixel, half of G sub-sub-pixels of each G sub-pixel and half of B sub-sub-pixels of each B sub-pixel, and meanwhile applying a right-eye image signal to the other half of R sub-sub-pixels of each R sub-pixel, the other half of G sub-sub-pixels of each G sub-pixel and the other half of B sub-sub-pixels of each B sub-pixel; and meanwhile driving the slit grating 4 to form light-blocking strips 41 and light-transmitting strips 42, which are alternated, so that upon the display device being viewed at a predetermined viewing position, light passing through the sub-sub-pixels applied with the right-eye image signal is blocked by the light-blocking strips 41 and cannot enter the left eye, light passing through the sub-sub-pixels applied with the left-eye image signal is transmitted from the light-transmitting strips 42 and enters the left eye, the light passing through the sub-sub-pixels applied with the left-eye image signal is blocked by the light-blocking strips 41 and cannot enter the right eye, and the light passing through the sub-sub-pixels applied with the right-eye image signal is transmitted from the light-transmitting strips 42 and enters the right eye.

By utilization of the pixel arrangement structure and the driving method, in a situation in which a person views the display device at a certain position, because there is parallax between the left eye and the right eye, the light entering the left eye is only the light passing through the sub-sub-pixels applied with the left-eye image signal and the light entering the right eye is only the light passing through the sub-sub-pixels applied with the right-eye image signal, the left-eye image and the right-eye image are superimposed and synthesized in the human brain, and hence the 3D image effect can be produced.

Figure 5:
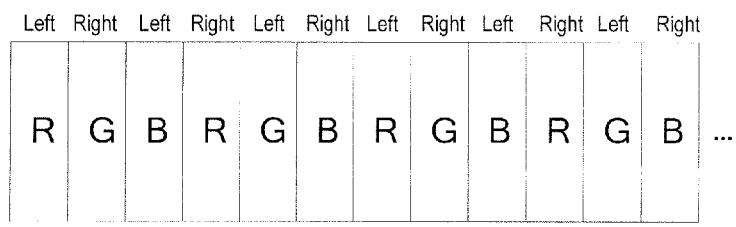
FIG. 5 is a drive schematic view of a 3D display device.

As illustrated in FIG. 5, the arrangement of a color filter of a 3D display device is provided according to circulation of the sequence of R sub-pixels, B sub-pixels and G sub-pixels. In the case of 3D display, in two adjacent sub-pixels, one is applied with a left-eye image signal and the other is applied with a right-eye image signal, and hence the 3D display can be achieved. The arrangement of the color filter in an embodiment of the present disclosure is also provided according to the circulation of the sequence of R sub-pixels, B sub-pixels and G sub-pixels, and has difference that: each sub-pixel is also subdivided into an even number of sub-sub-pixels with the same color; the size of each sub-sub-pixel can be the same with the size of one sub-pixel in FIG. 5; the even number of the sub-sub-pixels of each sub-pixel are uniformly divided into two parts, one part of which is applied with a left-eye image signal and the other part of which is applied with a right-eye image signal; and hence the 3D display function can be achieved.

On the basis of achieving 3D display, the size of each sub-sub-pixel in the embodiment of the present disclosure can be set to be the same with the size of one sub-pixel in FIG. 5, so that the resolution of the 3D display device in the embodiment of the present disclosure is the same with the resolution of the 3D display device shown in FIG. 5. Meanwhile, because the sub-sub-pixels included by each sub-pixel in the embodiment of the present disclosure have the same color and are adjacent to each other in position, all the sub-sub-pixels included by one sub-pixel can be formed in a same step, namely the sub-pixels of one color can be formed in one step. Moreover, because the size of the sub-sub-pixels included by one sub-pixel in the embodiment of the present disclosure is the same with the size of one sub-pixel in FIG. 5, the size of a single sub-pixel in the embodiment of the present disclosure is larger, so that the requirement on the fineness of a mask for forming the sub-pixels can be reduced and the alignment of the mask can be easier, and hence the manufacturing difficulty of the color filter can be reduced.

In the color filter provided by the embodiment of the present disclosure, the number of the red sub-sub-pixel regions included by the red sub-pixel region A1 (namely the number of the arranged R resists), the number of the green sub-sub-pixel regions included by the green sub-pixel region A2 (namely the number of the arranged G resists), and the number of the blue sub-sub-pixel regions included by the blue sub-pixel region A3 (namely the number of the arranged B resists) can be set to be identical.

On the premise of not obviously influencing the display quality, in at least one embodiment of the present disclosure, each sub-pixel region of the color filter includes two sub-sub-pixel regions with the same color (namely two color resists with a same color are arranged). For instance, the R sub-pixel region A1 includes two R sub-sub-pixel regions (namely two R resists R1 and R2 are arranged); the G sub-pixel region A2 includes two G sub-sub-pixel regions (namely two G resists G1 and G2 are arranged); and the B sub-pixel region A3 includes two B sub-sub-pixel regions (namely two B resists B1 and B2 are arranged). Of course, the embodiment of the present disclosure is not limited thereto.

At this point, in the case of driving the display device, a left-eye image signal is applied to one sub-sub-pixel in each sub-pixel and a right-eye image signal is applied to the other sub-sub-pixel; and in one row of sub-sub-pixels, the sub-sub-pixels applied with the left-eye image signal and the sub-sub-pixels applied with the right-eye image signal are alternately arranged. That is to say, the sub-sub-pixels applied with the left-eye image signal are R1, G1 and B1, and the sub-sub-pixels applied with the right-eye image signal are R2, G2 and B2.

To put it another way, because odd columns of sub-pixels are formed by R1, G1 and B1 and even columns of sub-pixels are formed by R2, G2 and B2, in the case of driving, within the time period of one frame, a left-eye image signal is applied to the odd columns of sub-sub-pixels R1, G1 and B1 and meanwhile a right-eye image signal is applied to the even columns of sub-sub-pixels R2, G2 and B2. Meanwhile, a slit grating 4 is driven to form light-blocking strips 41 and light-transmitting strips 42, which are alternated, so that upon the display device being viewed at a predetermined viewing position, light passing through the even columns of sub-sub-pixels R2, G2 and B2 is blocked by the light-blocking strips 41 and cannot enter the left eye, light passing through the odd columns of sub-sub-pixels R1, G1 and B1 is transmitted from the light-transmitting strips 42 and enters the left eye, namely the left eye can only view the odd columns of sub-sub-pixels R1, G1 and B1; and so that the light passing through the odd columns of sub-sub-pixels R1, G1 and B1 is blocked by the light-blocking strips 41 and cannot enter the right eye, and the light passing through the even columns of sub-sub-pixels R2, G2 and B2 is transmitted from the light-transmitting strips 42 and enters the right eye, namely the right eye can only view the even columns of sub-sub-pixels R2, G2 and B2; and hence the left-eye image light and the right-eye image light are separated in space.

Of course, a right-eye image signal can also be applied to odd columns of sub-sub-pixels R1, G1 and B1 and meanwhile a left-eye image signal can be applied to even columns of sub-sub-pixels R2, G2 and B2. Meanwhile, a slit grating 4 is driven to form light-blocking strips 41 and light-transmitting strips 42, which are alternated, so that upon the display device being viewed at a predetermined viewing position, light passing through the odd columns of sub-sub-pixels R1, G1 and B1 is blocked by the light-blocking strips 41 and cannot enter the left eye and light passing through the even columns of sub-sub-pixels R2, G2 and B2 is transmitted from the light-transmitting strips 42 and enters the left eye, namely the left eye can only view the even columns of sub-sub-pixels R2, G2 and B2; the light passing through the even columns of sub-sub-pixels R2, G2 and B2 is blocked by the light-blocking strips 41 and cannot enter the right eye and the light passing through the odd columns of sub-sub-pixels R1, G1 and B1 is transmitted from the light-transmitting strips 42 and enters the right eye, namely the right eye can only view the odd columns of sub-sub-pixels R1, G1 and B1; and hence the left-eye image light and the right-eye image light are separated in space.

Taking the case that each sub-pixel includes two sub-sub-pixels with a same color, namely each sub-pixel region of the color filter is provided with two color resists with a same color, as an example, the manufacturing process of the color filter, for instance, can include the following steps S01 to S04. The steps will be described below one by one.

Figure 6:
FIGS. 6 to 9 are views illustrating steps of a color filter manufacturing method provided by an embodiment of the present disclosure.

Step S01: as illustrated in FIG. 6, forming a pattern comprising a black matrix 2 on a substrate 1.

Figure 7:
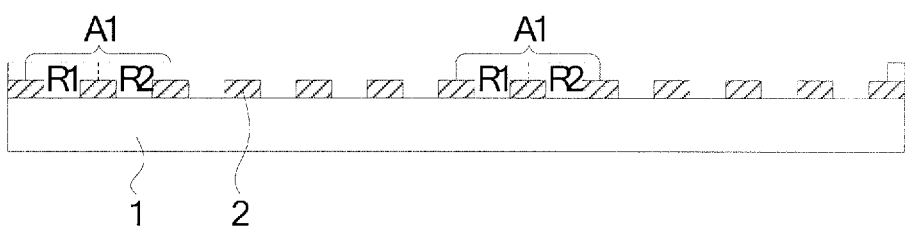

Step S02: as illustrated in FIG. 7, forming R resists R1 and R2 in R sub-pixel regions A1 by a patterning process.

For instance, an R resist material is spin-coated on the substrate; subsequently, the R resist material is subjected to exposure by using a mask, of which the sub-pixel width is twice the sub-pixel width of the color filter in FIG. 5, and to development; partial R resist material is removed and the R resist material in the R sub-pixel regions A1 to be formed is retained; and the R resists R1 and R2 are formed. The formed R resists R1 and R2 are disposed in two adjacent mesh regions formed by the black matrix 2.

Figure 8:
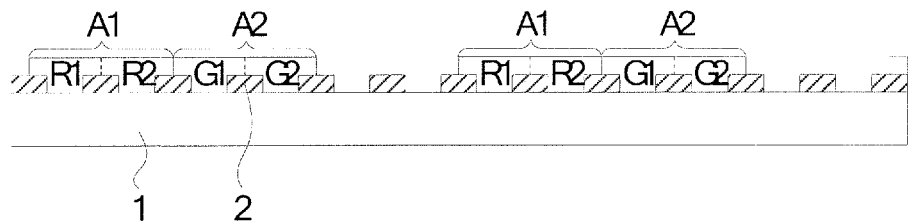

Step S03: as illustrated in FIG. 8, forming G resists G1 and G2 in G sub-pixel regions A2 by a patterning process.

For instance, a G resist material is spin-coated on the substrate; subsequently, the G resist material is subjected to exposure by using a mask, of which the sub-pixel width is twice the sub-pixel width of the color filter in FIG. 5, and to development; partial G resist material is removed and the G resist material in the G sub-pixel regions A2 to be formed is retained; and the G resists G1 and G2 are formed. The formed G resists G1 and G2 are disposed in two adjacent mesh regions formed by the black matrix 2.

Figure 9:
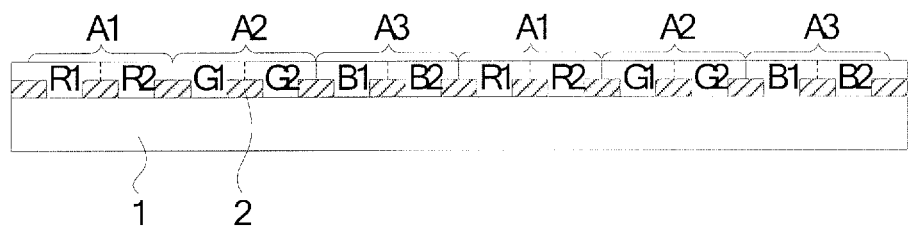

Step S04: as illustrated in FIG. 9, forming B resists B1 and B2 in B sub-pixel regions A3 by a patterning process.

For instance, a B resist material is spin-coated on the substrate; subsequently, the B resist material is subjected to exposure by using a mask, of which the sub-pixel width is twice the sub-pixel width of the color filter in FIG. 5, and to development; partial B resist material is removed and the B resist material in the B sub-pixel regions A3 to be formed is retained; and the B resists B1 and B2 are formed. The formed B resists B1 and B2 are disposed in two adjacent mesh regions formed by the black matrix 2.

It should be noted that the forming sequence of the R sub-pixels, the G sub-pixels and the B sub-pixels is not limited in the embodiment of the present disclosure.

In addition, the method adopted by the above-mentioned manufacturing process relates to a pigment dispersion method. On the basis of the structure of the color filter provided by the embodiment of the present disclosure, the methods such as printing method, slurry jet method and organic material plating method can also be adopted by those skilled in the art for manufacturing the color filter.

It should be noted that FIG. 4 only illustrates the arrangement condition of one row of sub-sub-pixels in the display device. Actually, the display device includes a plurality of rows of sub-sub-pixels arranged in accordance with FIG. 4.

In the embodiment of the present disclosure, it is supposed that the width Ww of a slit of the grating 4, the width Ws of a grating unit (namely the sum of the width of one light-blocking strip and the width of one light-transmitting strip), and the distance D between the grating 4 and the display surface of the display panel 3 can be obtained by the calculation of the width Wp of a single sub-pixel in the display panel 3 (namely the sum of the widths of the even number of sub-sub-pixels belonging to the same sub-pixel; illustration is given in FIG. 3 by taking two sub-sub-pixels as an example), the distance Q between the left eye and the right eye of a human being, and the distance L between the display surface of the display panel 3 and the human eyes (namely the foregoing "viewing position").

In general, it can be considered that the distance Q between the left eye and the right eye of the human being and the distance L between the display surface of the display panel 3 and the human eyes are unchanged and Ww, Ws and D are determined by the width Wp of the pixel. The value of Wp refers to the sum of the widths of the sub-sub-pixels included by a single sub-pixel. The width of a single sub-sub-pixel is the same with the width of a single sub-pixel in FIG. 5. After the value Wp is respectively substituted into the formulas:

$$Ww = \frac{Q \times Wp}{Q + Wp}, \quad Ws = K \times \frac{Q \times Wp}{Q + Wp}$$

(in which K is a constant coefficient) and $$D = \frac{L \times Wp}{Q + Wp},$$

the values of Ww, Ws and D can be respectively calculated.

The display panel 3 (comprising the color filter) and the grating 4 are set according to the calculated size. When a human views images at view points (e.g., a view point 1 and a view point 2) in front of the display device, due to the blocking function of the light-blocking strips 41 of the grating 4, the sub-sub-pixels that the left eye views are only the sub-sub-pixels R1, G1 and B1 through the light-transmitting strips 42 of the grating 4 and the sub-sub-pixels that the right eye views are only the sub-sub-pixels R2, G2 and B2 through the light-transmitting strips 42 of the grating 4. The sub-sub-pixels R1, G1 and B1 are driven to display the left-eye image (or the right-eye image), the sub-sub-pixels R2, G2 and B2 are driven to display the right-eye image (or the left-eye image), and because the left-eye image and the right-eye image are images captured from different angles, a 3D image can be obtained by the superimposition of the left-eye image and the right-eye image received by the two eyes of the human being.

It should be noted that the display device provided by the embodiment of the present disclosure can be a liquid crystal display panel, an e-paper, an OLED (organic Light-Emitting Diode) panel or the like and is applicable to any product or component with display function such as a mobile phone, a tablet PC, a TV, a display, a notebook computer, a digital picture frame and a navigator.

In the color filter and the manufacturing method thereof, the display panel, and the display device and the driving method thereof, provided by the embodiments of the present disclosure, an even number of color resists with a same color are disposed in each sub-pixel region of the color filter; each color resist corresponds to a sub-sub-pixel region; a left-eye image signal is applied to half of sub-sub-pixels of each sub-pixel and meanwhile a right-eye image signal is applied to the other half of the sub-sub-pixels; and hence 3D display can be achieved. Obviously, the size of the sub-sub-pixels in the embodiments of the present disclosure can be the same with the size of the sub-pixels in the color filter as shown in FIG. 5. That is to say, the resolution of the color filter in the embodiments of the present disclosure is the same with the resolution of the color filter in FIG. 5, and the size of the sub-pixel can be set to be at least twice as large as the size of the sub-pixel of the color filter in FIG. 5. Moreover, all the sub-sub-pixels in the sub-pixels of one color have a same color and can be formed in a same step. Therefore, the manufacturing precision and the alignment accuracy of a mask required for manufacturing the color filter provided by the embodiments of the present disclosure can be reduced, and hence the manufacturing difficulty of the color filter can be reduced.

What are described above is related to the illustrative embodiments of the disclosure only and not limitative to the scope of the disclosure; the scopes of the disclosure are defined by the accompanying claims.

The application claims priority to the Chinese Patent Application No. 201410509950.7, filed on Sep. 28, 2014, which is entirely incorporated herein by reference as part of the application.

What is claimed is:

1. A display device, comprising a display panel and a slit grating superimposed on the display panel;
   the display panel comprises a color filter,
   wherein the color filter comprises a black matrix, a plurality of color resists respectively disposed in the plurality of mesh regions, and a plurality of pixel regions arranged in a matrix,
   the black matrix comprises a plurality of first black matrix strips extending along a row direction and a plurality of second black matrix strips extending along a column direction, and the plurality of first black matrix strips and the plurality of second black matrix strips are intersected with each other to form a plurality of mesh regions arranged in a matrix,
   the plurality of color resists and comprises red resists, green resists and blue resists,
   each of the pixel regions comprises a red sub-pixel region, a green sub-pixel region and a blue sub-pixel region, the red sub-pixel region comprises an even number of red sub-sub-pixel regions, which are fabricated by a first mask, a width of a sub-pixel of which is twice of a width of the red sub-sub-pixel region, each of the red sub-sub-pixel regions is provided with one of the red resists therein, the green sub-pixel region comprises an even number of green sub-sub-pixel regions, which are fabricated by a second mask, a width of a sub-pixel of which is twice of a width of the green sub-sub-pixel region, each of the green sub-sub-pixel regions is provided with one of the green resists therein, and the blue sub-pixel region comprises an even number of blue sub-sub-pixel regions, which are fabricated by a third mask, a width of a sub-pixel of which is twice of a width of the blue sub-sub-pixel region, and each of the blue sub-sub-pixel regions is provided with one of the blue resists therein;
   the color filter and the slit grating are configured for making light emit by the even number of red sub-sub-pixel regions of each of the red sub-pixel regions transmit through one of first two adjacent light-transmitting stripes of the slit grating and forming a left-eye image and a right-eye image corresponding to a first user, making light emit by the even number of red sub-sub-pixel regions of each of the red sub-pixel regions further transmit through another one of the first two adjacent light-transmitting stripes of the slit grating and forming a left-eye image and a right-eye image corresponding to a second user, making light emit by the even number of green sub-sub-pixel regions of each of the green sub-pixel regions transmit through one of second two adjacent light-transmitting stripes of the slit grating and forming the left-eye image and the right-eye image corresponding to the first user, making light emit by the even number of green sub-sub-pixel regions of each of the green sub-pixel regions further transmit through another one of the second two adjacent light-transmitting stripes of the slit grating and forming the left-eye image and the right-eye image corresponding to the second user, making light emit by the even number of blue sub-sub-pixel regions of each of the blue sub-pixel regions transmit through one of third two adjacent light-transmitting stripes of the slit grating and forming the left-eye image and the right-eye image corresponding to the first user, making light emit by the even number of blue sub-sub-pixel regions of each of the blue sub-pixel regions further transmit through another one of the third two adjacent light-transmitting stripes of the slit grating and forming the left-eye image and the right-eye image corresponding to the second user,
   the left-eye image and the right-eye image corresponding to the first user are different, the left-eye image and the right-eye image corresponding to the second user are different, the first user and the second user are located at different positions relative to the display device,
   the color filter and the slit grating are further configured for making light emit by the red sub-pixel region, the green sub-pixel region and the blue sub-pixel region of a same pixel region transmit through different light-transmitting stripes of the slit grating and forming a left-eye image and a right-eye image corresponding to same one user;

the color filter and the slit grating are further configured to allow an orthographic projection of the slit grating on the color filter fall within the color filter, and to allow an orthographic projection of the left-eye images and the right-eye images, corresponding to the first user and the second user, on the color filter fall within the color filter and fall within the orthographic projection of the slit grating on the color filter; and wherein the slit grating comprises a plurality of light-transmitting stripes and a plurality of light-blocking stripes arranged alternately;

wherein a distance Q between the left eyes and the right eyes of the first user and the second user, a distance L between a display surface of the display panel and the left eyes and the right eyes of the first user and the second user, a sum of widths Wp of the sub-sub-pixels included by a sub-pixel, a distance D between the slit grating and the display surface of the display panel, a width Ww of a slit of the slit grating, and a width Ws of a grating unit are satisfy the following equations:

$$Ww = \frac{Q \times Wp}{Q + Wp},$$

$$Ws = K \times \frac{Q \times Wp}{Q + Wp},$$

$$D = \frac{L \times Wp}{Q + Wp},$$

wherein K is a constant coefficient.

2. A driving method for a display device wherein the display device comprises a display panel and a slit grating superimposed on the display panel, the display panel of the display device comprises a plurality of pixels arranged in a matrix, each of the pixels comprises a red sub-pixel, a green sub-pixel and a blue sub-pixel, the red sub-pixel comprises an even number of red sub-sub-pixels, which are fabricated by a first mask, a width of a sub-pixel of which is twice of a width of the red sub-sub-pixel region, the green sub-pixel comprises an even number of green sub-sub-pixels, which are fabricated by a second mask, a width of a sub-pixel of which is twice of a width of the green sub-sub-pixel region, and the blue sub-pixel comprises an even number of blue sub-sub-pixels, which are fabricated by a third mask, a width of a sub-pixel of which is twice of a width of the blue sub-sub-pixel region; and the driving method comprises:

within a time period of a frame, applying a left-eye image signal to half of the red sub-sub-pixels of the red sub-pixel, half of the green sub-sub-pixels of the green sub-pixel, and half of the blue sub-sub-pixels of the blue sub-pixel, and meanwhile applying a right-eye image signal to the other half of the red sub-sub-pixels of the red sub-pixel, the other half of the green sub-sub-pixels of the green sub-pixel, and the other half of the blue sub-sub-pixels of the blue sub-pixel; and meanwhile forming light-blocking strips and light-transmitting strips, which are alternated, in the slit grating, so that upon the display device being viewed at a predetermined viewing position, light passing through the sub-sub-pixels applied with the right-eye image signal is blocked by the light-blocking strips and cannot enter a left eye of a viewer, and light passing through the sub-sub-pixels applied with the left-eye image signal is transmitted from the light-transmitting strips and enters the left eye, the light passing through the sub-sub-pixels applied with the left-eye image signal is blocked by the light-blocking strips and cannot enter a right eye of the viewer, and the light passing through the sub-sub-pixels applied with the right-eye image signal is transmitted from the light-transmitting strips and enters the right eye;

wherein the plurality of pixels and the slit grating are configured for making light passing through the even number of red sub-sub-pixels of each of the red sub-pixels transmit through one of first two adjacent light-transmitting stripes of the slit grating and forming a left-eye image and a right-eye image corresponding to a first user, making light emit by the even number of red sub-sub-pixel regions of each of the red sub-pixel regions further transmit through another one of the first two adjacent light-transmitting stripes of the slit grating and forming a left-eye image and a right-eye image corresponding to a second user, making light passing through the even number of green sub-sub-pixels of each of the green sub-pixels transmit through one of second two adjacent light-transmitting stripes of the slit grating and forming the left-eye image and the right-eye image corresponding to the first user, making light emit by the even number of green sub-sub-pixel regions of each of the green sub-pixel regions further transmit through another one of the second two adjacent light-transmitting stripes of the slit grating and forming the left-eye image and the right-eye image corresponding to the second user, making light passing through the even number of blue sub-sub-pixels of each of the blue sub-pixels transmit through one of third two adjacent light-transmitting stripes of the slit grating and forming a left-eye image and a right-eye image corresponding to the first user, making light emit by the even number of blue sub-sub-pixel regions of each of the blue sub-pixel regions further transmit through another one of the third two adjacent light-transmitting stripes of the slit grating and forming the left-eye image and the right-eye image corresponding to the second user, the left-eye image and the right-eye image corresponding to a first user are different, the left-eye image and the right-eye image corresponding to a second user are different, the first user and the second user are located at different positions relative to the display device, the color filter and the slit grating are further configured for making light emit by the red sub-pixel region, the green sub-pixel region and the blue sub-pixel region of a same pixel region transmit through different light-transmitting stripes of the slit grating and forming a left-eye image and a right-eye image corresponding to same one user; and the color filter and the slit grating are further configured to allow an orthographic projection of the slit grating on the color filter fall within the color filter, and to allow an orthographic projection of the left-eye images and the right-eye images, corresponding to the first user and the second user, on the color filter fall within the color filter and fall within the orthographic projection of the slit grating on the color filter;

wherein a distance Q between the left eyes and the right eyes of the first user and the second user, a distance L between a display surface of the display panel and the left eyes and the right eyes of the first user and the second user, a sum of widths Wp of the sub-sub-pixels included by a sub-pixel, a distance D between the slit grating and the display surface of the display panel, a width Ww of a slit of the slit grating, and a width Ws of a grating unit are satisfy the following equations:

$$Ww = \frac{Q \times Wp}{Q + Wp},$$

$$Ws = K \times \frac{Q \times Wp}{Q + Wp},$$

$$D = \frac{L \times Wp}{Q + Wp},$$

wherein K is a constant coefficient.

3. The driving method for the display device according to claim 2, wherein
the red sub-pixel comprises two red sub-sub-pixels, the green sub-pixel comprises two green sub-sub-pixels, and the blue sub-pixel comprises two blue sub-sub-pixels; and the driving method comprises:
within the time period of the frame, applying the left-eye image signal to odd columns of sub-sub-pixels and meanwhile applying the right-eye image signal to even columns of sub-sub-pixels; and meanwhile forming the light-blocking strips and light-transmitting strips, which are alternated, in the slit grating, so that upon the display device being viewed at the predetermined viewing position, light passing through the even columns of sub-sub-pixels is blocked by the light-blocking strips and cannot enter the left eye, light passing through the odd columns of sub-sub-pixels is transmitted from the light-transmitting strips and enters the left eye, the light passing through the odd columns of sub-sub-pixels is blocked by the light-blocking strips and cannot enter the right eye, and the light passing through the even columns of sub-sub-pixels is transmitted from the light-transmitting strips and enters the right eye; or
applying the right-eye image signal to odd columns of sub-sub-pixels and meanwhile applying the left-eye image signal to even columns of sub-sub-pixels; and meanwhile forming the light-blocking strips and light-transmitting strips, which are alternated, in the slit grating, so that upon the display device being viewed at the predetermined viewing position, light passing through the odd columns of sub-sub-pixels is blocked by the light-blocking strips and cannot enter the left eye, light passing through the even numbers of sub-sub-pixels is transmitted from the light-transmitting strips and enters the left eye, the light passing through the even number of sub-sub-pixels is blocked by the light-blocking strips and cannot enter the right eye, and light passing through the odd columns of sub-sub-pixels is transmitted from the light-transmitting strips and enters the right eye.

* * * * *